United States Patent [19]
Karlsson et al.

[11] Patent Number: 5,229,928
[45] Date of Patent: Jul. 20, 1993

[54] CONVERTER INPUT/OUTPUT VOLTAGE BALANCING CONTROL

[75] Inventors: Bror M. Karlsson, Huddinge; Nils T. Bäckman, Stockholm, both of Sweden

[73] Assignee: Telefonaktiebolaget L M Ericsson, Stockholm, Sweden

[21] Appl. No.: 780,820

[22] Filed: Oct. 23, 1991

[30] Foreign Application Priority Data

Oct. 24, 1990 [SE] Sweden .................... 9003399

[51] Int. Cl.[5] ......................................... H02M 7/537
[52] U.S. Cl. ......................................... 363/65; 363/71; 363/97; 363/131
[58] Field of Search .............. 363/16, 17, 65, 71, 363/72, 97, 98, 131, 132, DIG. 1

[56] References Cited

U.S. PATENT DOCUMENTS

| | | | |
|---|---|---|---|
| 4,062,057 | 12/1977 | Perkins et al. | 363/71 |
| 4,347,558 | 8/1982 | Kalinsky | 363/17 |
| 4,357,558 | 11/1982 | Massoni et al. | 315/83 |
| 4,631,653 | 12/1986 | Small | 363/98 |
| 4,644,458 | 2/1987 | Harafuji et al. | 363/65 |
| 4,717,994 | 1/1988 | Diaz et al. | 363/132 |
| 4,719,559 | 1/1988 | Sokal et al. | 363/98 |
| 4,783,728 | 11/1988 | Hoffman | 363/71 |
| 4,800,477 | 1/1989 | Esposito | 363/17 |
| 4,805,081 | 2/1989 | Chambers et al. | 363/71 |
| 5,060,130 | 10/1991 | Steigerwald | 363/65 |
| 5,088,017 | 2/1992 | Yaginuma et al. | 363/65 |

FOREIGN PATENT DOCUMENTS

| | | |
|---|---|---|
| 0162374 | 11/1985 | European Pat. Off. |
| 60-106361 | 6/1985 | Japan. |
| 81/00002 | 1/1981 | PCT Int'l Appl. |

Primary Examiner—Steven L. Stephan
Assistant Examiner—Jeffrey Sterrett
Attorney, Agent, or Firm—Burns, Doane, Swecker & Mathis

[57] ABSTRACT

The invention relates to a method and a circuit arrangement for controlling power valves included in at least one converter (2,4) forming part of a converter circuit which on its input receives at least two DC voltages (U1,U2) and transmits current pulses respectively corresponding to these DC voltages to a common load ($R_L$) via a common output filter (L1,C1), said controlling aiming at keeping the input DC voltages equal.

A control circuit (44) regulates the input voltages by shifting the starting times of the respective current pulses with respect to each other. Preferably, and particularly in continuous operation, the respective current pulses are shifted with respect to each other essentially without changing there widths.

12 Claims, 7 Drawing Sheets

CONVERTER INPUT/OUTPUT VOLTAGE BALANCING CONTROL

TECHNICAL AREA

The present invention relates to a method and a circuit arrangement for controlling power valves included in at least one converter forming part of a converter coupling, which on its input receives at least two DC voltages and transmits current pulses corresponding respectively to these DC voltages, to a common load via a common output filter, said controlling aiming at keeping said DC voltages equal.

In pulse width modulated current-mode converters with a pulse width of over 50% of the cycle of a current pulse so called slope compensation has to be resorted to for avoiding unstable control of the converters. A closer description of this can be obtained e.g. in "Application Note U-97" from the company Unitrode having the title "Modelling, Analysis and Compensation of the Current-Mode Controller". As will also appear more closely rom the description below slope compensation shortly implies in the present case that the control is carried through by means of a stop pulse for each current pulse, said stop pulse being formed by the aid of a ramp voltage. The ramps of the ramp voltage have a slope opposite to the slope of the current pulse ramps formed due to the output filter, and appear with a cycle equal to the cycle of the current pulse, corresponding to an input DC voltage, divided by the number of input DC voltages. A further ramp voltage is formed by subtraction of the first mentioned ramp voltage from a pulse voltage proportional to the added current pulses, corresponding to the input DC voltages, and the stop pulse is generated each time the ramps of this further ramp voltage reach a predetermined fixed voltage level.

It is important in an arrangement of the kind indicated by way of introduction that the input DC voltages are equal, i.e. that no unbalance appears, since this can give rise to several serious drawbacks. Small differences between the efficiencies of e.g. two converters require the possibility of being able to adjust the power output from the converters individually.

It is also desirable that the frequency of the output filer is as high as possible in order to be easy to be filtered away. Thus it is desired that all pulses and all pulse intervals shall be as equal as possible in order to make only the sum frequency from all converters to appear in the filter.

With unbalance is here meant that the input DC voltages are unequal and that the converters feed the output filter with current having a frequency spectrum containing a frequency lower than that for which the filer is dimensioned. Ripple appears on the output and disturbances on the input. One of the converters can be overloaded and the other one gives a considerably less power than that for which it is intended. At worst one of the converters can get such a high input voltage that it becomes defective. One form of unbalance where the input voltages are equal but pulses and pulse intervals are unequal, can also appear. In that case the symptoms are limited to heavy disturbances on the input and output.

STATE OF THE ART

A circuit arrangement of essentially the kind indicated above by way of introduction is known through EP 0 162 374. In this prior circuit arrangement the control is carried through by changing the switched on times of the current converters so that the relative deviations of the input DC voltages are outbalanced if said deviations exceed a predetermined amount. This solution is not able to take care of the case that one or both of the input voltages sinks below a certain value, but requires for this case the emergency solution that the coupling arrangement is entirely switched off.

A further circuit arrangement of essentially the kind indicated above by way of introduction is disclosed in U.S. Pat. No. 4,347,558. In this arrangement the two input voltages are balanced by controlling the switched-on time of the power valves, i.e. the width of the output current pulses is changed. This prior art circuit arrangement does not solve the problem occurring when current mode control is used as a way of regulation. Current mode control is not even mentioned in this prior art.

U.S. Pat. No. 4,062,057, JP 60-106 361, and WO 81 02077 are representative for the general state of the art without teaching anything resembling the present invention as disclosed below.

DESCRIPTION OF THE INVENTION

The object of the present invention is to provide a method and a circuit arrangement of the kind indicated by way of introduction, by means of which a complete solution to the problem of regulating the converter power outputs derived from the input DC voltages is obtained, i.e. the solution shall take care of all of the above-mentioned problems appearing in connection with regulation. It shall furthermore be able to work under all operational conditions, i.e. under continuous as well as discontinuous output filter inductor current operation.

In the method according to the invention this object has been attained by the step of shifting the the respective current pulses with respect to each other essentially without changing their widths.

In the circuit arrangement according to the invention the above mentioned object has been attained by means of a control circuit for regulating the input voltages by shifting the respective current pulses with respect to each other essentially without changing their widths.

Embodiments of the method and the circuit arrangement according to the invention appear from the description and the drawings and are claimed in the appended claims.

DESCRIPTION OF THE DRAWINGS

The invention will now be described more closely below with reference to embodiments shown on the attached drawings.

On the drawings

PREFERRED EMBODIMENT

Figure 1:
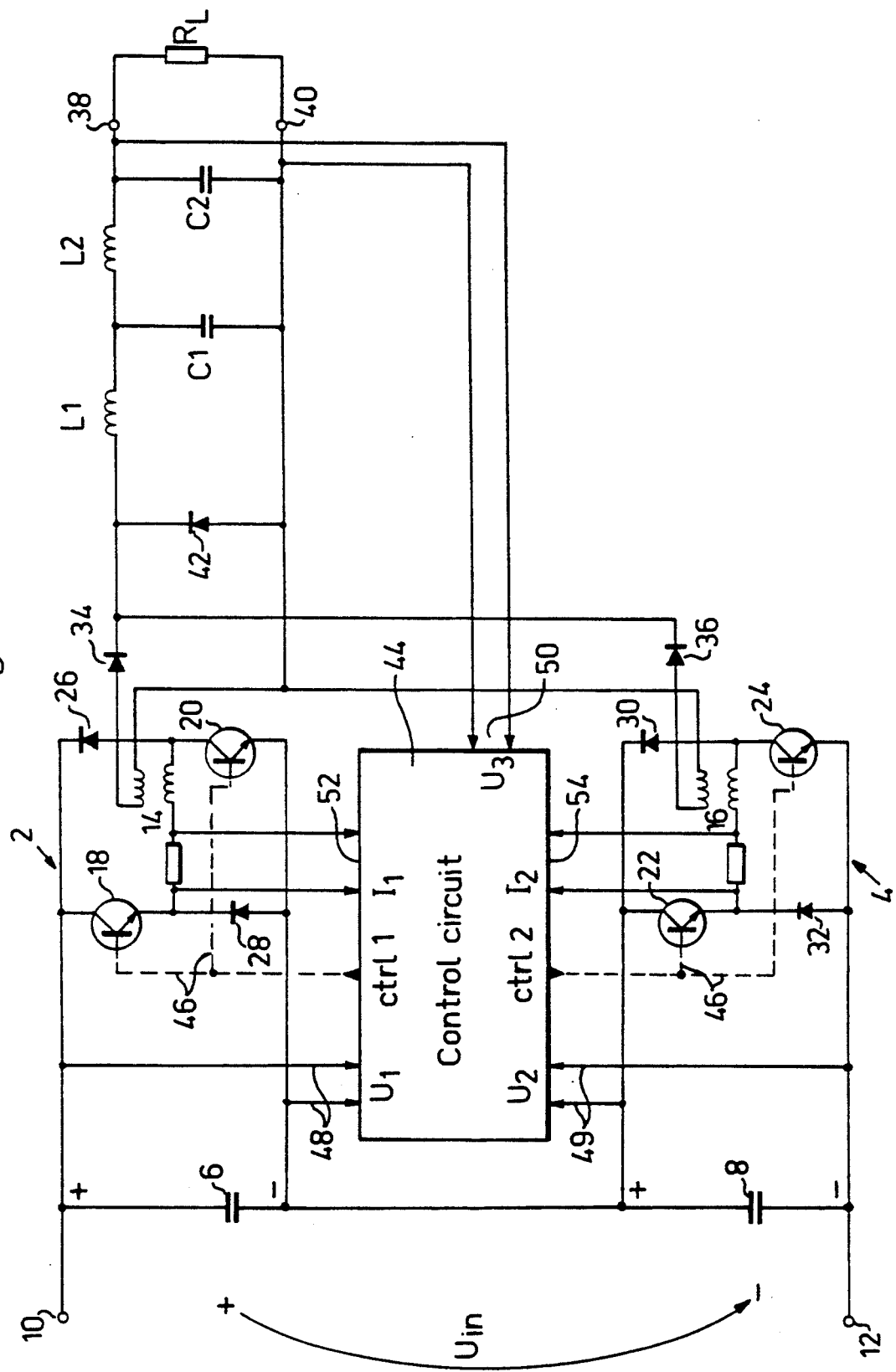
FIG. 1 is a principle circuit diagram of a converter circuit in which the invention can be used.

The circuit arrangement shown in FIG. 1 includes two equal converters generally designated 2 and 4, respectively. The converters 2 and 4 have series connected inputs including each an input capacitor 6 and 8, respectively. More particularly, the capacitors 6 and 8 are connected in series with each other between input terminals 10 or 12, respectively, of the circuit arrangement. Each of these converters 2 and 4 contain a current-mode controlled converter bridge, of which one diagonal extends in parallel with the corresponding respective input capacitor 6,8. The respective other diagonal of said bridges contains a primary winding of an output transformer 14 or 16, respectively.

In each bridge furthermore a transistor 18 or 22, respectively, the primary winding of the transformer 14 or 16, respectively, and a transistor 20 and 24, respectively, are series connected in parallel with the respective input capacitor 6 or 8. More particularly the first mentioned transistor 18 or 20, respectively, is connected to the positive side of the input capacitor 14 or 16, respectively, and the direction of conduction of both transistors is from the positive side. In each bridge furthermore a diode 26 or 30, respectively, the primary winding 14 or 16, respectively, and a diode 28 or 32, respectively, are series in parallel with the input capacitor 14 or 16, respectively. More particularly the first-mentioned diode 26 or 30, respectively, is connected to the positive side of the input capacitor 14 or 16, respectively, and the blocking direction of both diodes is towards the positive side.

The secondary windings of the respective transformers 14,16 are connected in parallel to each other via rectifier diodes 34 or 36, respectively, and operate in common on a load $R_L$ connectable to output terminals 38 and 40. In the output circuit leading the output terminals 38, 40 a shunted freewheel diode 42 is included followed by an output filter $L_1$, C;$L_2$,$C_2$.

The circuit arrangement illustrated in FIG. 1 can be of a kind known per se as regards the details thereof thus far described above.

According to one aspect of the present invention the circuit arrangement includes a control circuit effecting that the current output from the converters 2,4 is regulated by the output current pulses of the respective converter being shifted with respect to each other essentially without change of their width so that the mean value of the voltage over the load is kept constant. In the control circuit, generally designated 44 in FIG. 1, this control is carried through, indicated by means of dashed lines 46 in FIG. 1, in a way to be disclosed more in detail below by means of switching-on and switching-off pulses to the transistors 18–24.

The regulation aimed at can be attained by shifting the starting and stop times for the current pulses somewhat ahead for the transistors of the converter having a low input voltage. By the shifting ahead of the starting time the current in the output filter has time to decrease somewhat further before the filter starts drawing current from the converter having a low input voltage.

As parameters for the control, indicated with ctrl1 and ctrl2, the respective input voltages $U_1$ and $U_2$ of the converters 2 and 4, as indicated at 48 and 49, respectively, the output voltage $U_3$ of the circuit arrangement applied over the load, as indicated at 50, and the respective currents $I_1$, $I_2$, through the primary windings of the respective transformers 14 and 16, as indicated at 52 and 54, respectively, are used.

Figure 2:
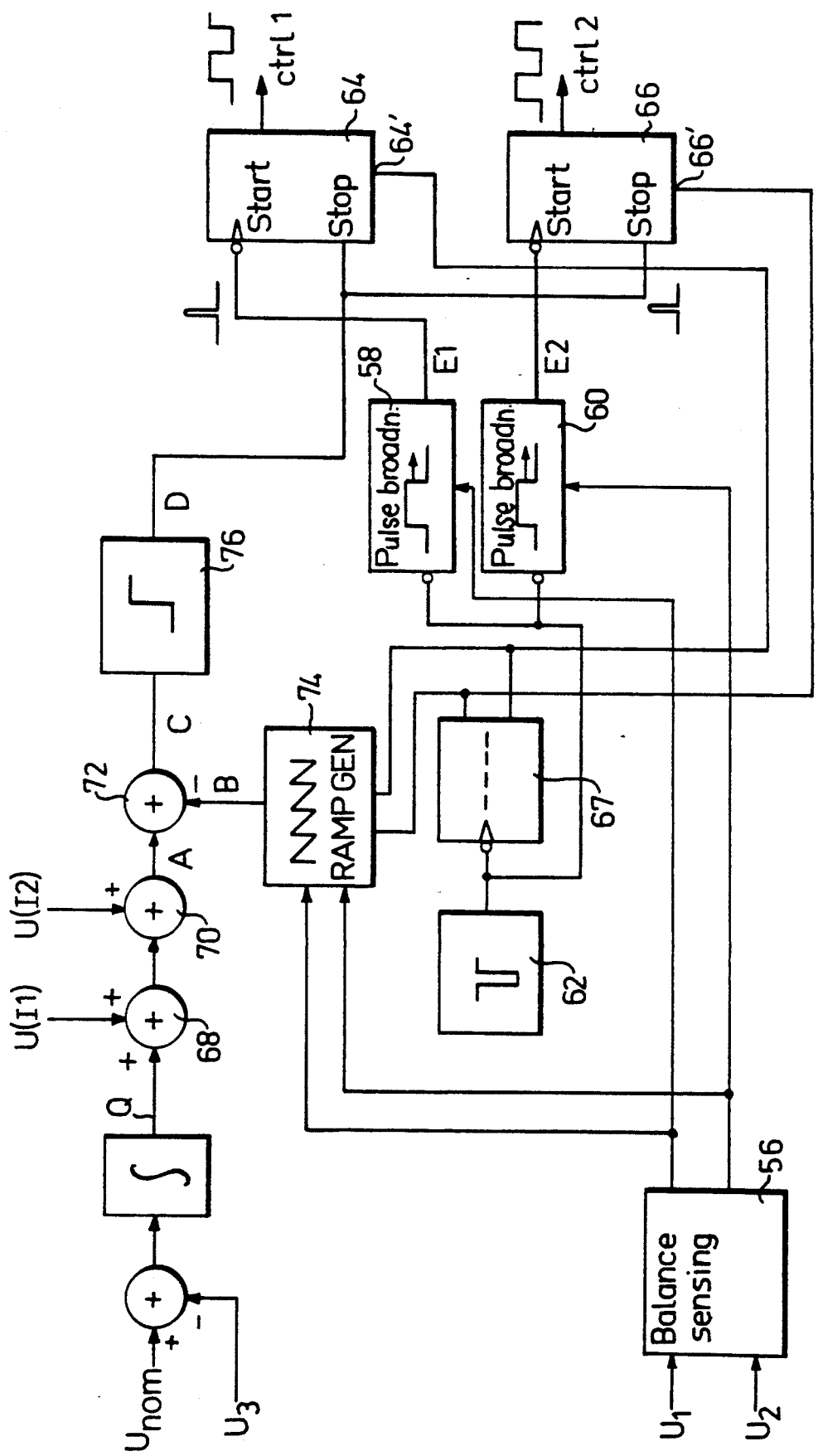
FIG. 2 is likewise a principle circuit diagram of an embodiment of a control circuit included in the circuit arrangement according to the invention.
Figure 3:
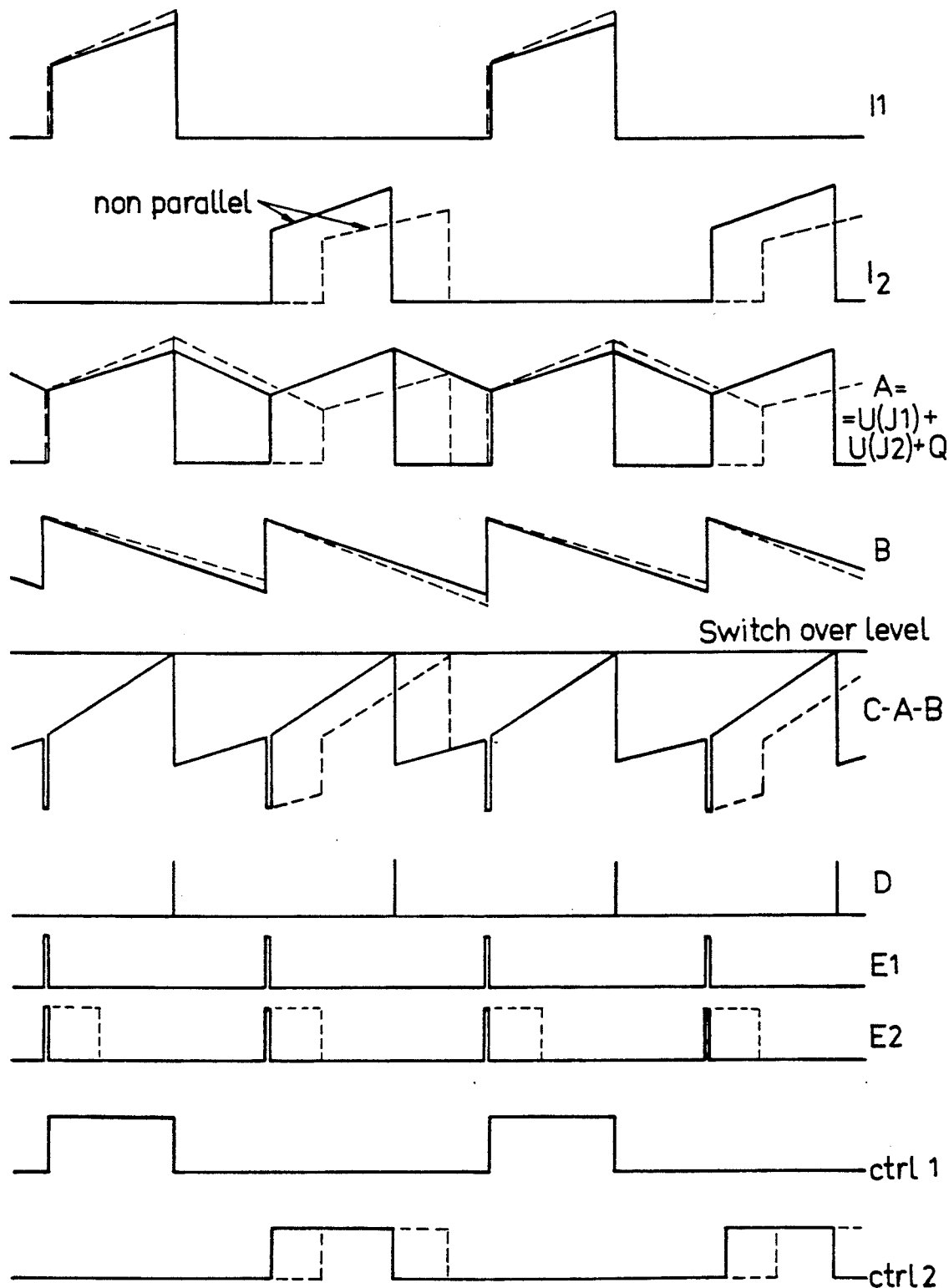
FIG. 3 illustrates current and voltage curves in connection with FIGS. 1 and 2.

Reference is now made to the principle diagram of the control circuit 44 in FIG. 2 in connection with the curves shown in FIG. 3.

The two voltages U1, U2 are processed in a balance sensing circuit 56 such that on one of the two outputs of the circuit a first signal is obtained representing the difference between the voltages, and on the other output a second signal is obtained, being the inverted value of the first signal. The first and second signals are fed to each one of two pulse broadening circuits 58, 60. To a respective inverting input 58', 60' of each pulse broadening circuit a clock signal from a clock generator 62 is also provided, that consists of very short negative pulses, which are thus inverted to positive pulses. The pulse width can be approximately 300 ns and the cycle 10 μs.

The pulse broadening circuits 58, 60 operate such that at the output of one of them a first triggering pulse appears having the same width as the clock pulse, and on the output of the other one a second triggering pulse is obtained which is broadened in proportion to the difference between the voltages U1,U2. These triggering pulses are designated E1 and E2 in FIGS. 2 and 3. The current pulses of the two converters 2 and 4 are triggered on by the negative edges of the respective triggering pulses. This is performed via pulse shaping and driving circuits 64 and 66, on the outputs of which the signals ctrl1 and ctrl2 appear.

Which one of the converters 2 and 4 to be triggered on is decided by à edge triggered bistable circuit 67, which in turn is triggered by the clock pulse from the clock generator 62 on the negative edge thereof. The point of time for the negative edge indicates the maximum pulse width for the preceding current pulse. The two outputs of the bistable circuit 67 are connected to blocking inputs 64' and 66', respectively, of the circuits 64 and 66. Activation of these blocking inputs brings about that the corresponding output of the respective circuit 64, 66 for the signal ctrl1 and ctrl2, respectively is locked in a position that prevents the transistors of the corresponding converters 2, 4 from conducting. From this also follows that every second of the pulses E1, E2 is superfluous. As is further illustrated at 68 and 70 in FIG. 2, voltages U(I1) and U(I2) derived rom the transistor currents I1 and I2 (indicated in FIG. 1 by the resistance in series with the respective primary winding of the transformers 14 and 16), are added to a voltage level Q obtained by integration of the difference between the voltage U3 and a nominal voltage $U_{nom}$. The resulting voltage is designated A in FIGS. 2 and 3 and can also be written as A=U(I1)+U(I2)+Q.

A compensating ramp voltage of the kind indicated by way of introduction is subtracted from the voltage A at 72, said compensating ramp voltage being obtained from a ramp generator 74, the output voltage of which being designated B in FIGS. 2 and 3. According to one aspect of the present invention the generator 74 is controlled by the signals on the outputs of the balance sensing circuit 56, as indicated by the arrows leading therefrom, so that the appearance of the ramp signal B can be effected by an occuring difference, if any, between the voltages U1 and U2. The ramp generator is also connected to the outputs of the bistable circuit 67, as is likewise indicated in FIG. 2, for controlling the operation of the ramp generator in a way which will appear more closely in connection with the description of the embodiment shown in FIG. 6.

The voltage resulting from the subtraction at 72 is designated C in FIG. 2 and 3. The voltage C is fed to a level detecting circuit 76 which switches over when the pulses of the voltage C reach a stipulated switching-over level. The voltage on the output of the circuit 76 is designated D in FIGS. 2 and 3. The voltage C increases so that the circuit 76 switches over to high (D), which provides a stop signal to the conducting transistor pair. This makes the current through the transistor pair to disappear, U(I1) (or U(I2) then decreasing the zero (A). Thereby also C decreases enough to make the circuit 76 to switch over and D to go low again. Thus the stop inputs of circuits 64 and 66 are not really edge triggered.

In FIG. 3 full lines indicate the currents I1 and I2 and curve shapes A–E1,E2 when there is balance between the converters 2 and 4, i.e. when U1=U2.

Depending upon the difference between the voltages U1 and U2 at unbalance, and depending upon the output signals from the balance sensing circuit 56, a modification of the output signal of the ramp generator 74 occurs on the one hand, and a broadening of one of the trigging signals from the circuits 58 and 60 on the other hand. Dashed lines illustrate in FIG. 3 the change the curve shapes are exposed to if U1 is somewhat greater than U2.

When the input voltage to one of the converter halves increases/decreases, the slope of the current ramp (I1 or I2) will increase/decrease to a corresponding degree, since the slope is proportional to the difference between the input voltage and the output voltage transformed to the primary side (the output voltage is constant). The changes of the slope of these signals are compensated by the change of the compensating ramp, cf. the dashed lines of I1 and I2 and the curve B, respectively, so that the slopes of the curve C remain unchanged or are overcompensated.

The upper profile of the curve A corresponds to the current in the output inductor L1. The negative ramps marked in the diagram (curve A) thus do not actually belong to the curve A. The current of the output inductor is of central importance, since the invention is based upon the intention that this current shall have time to decrease more before it is taken from the converter with low input voltage, than when it is taken from the other converter. As regards the curve A for the rest, it can be noted that the signal Q in the time perspective of interest is a signal of constant level.

The modification of the ramp voltage leads, via the function of the level detecting circuit 76, to the changed position shown with dashed lines of the stop pulses to the circuits 64 and 66. Due to the fact that, as mentioned, the starting and stop times for ctrl1 and ctrl2 are determined by the negative edge of the trigger impulses E1 and E2, and of the position of the spikes D, respectively, this results in the case of interest in the postponement of ctrl2 illustrated in FIG. 3. This in turn implies attainment of the desired result that the current pulses through the converters shall be shifted with respect to each other.

As should have appeared from the above the invention builds upon the principle that the relation between the current output in the converters is regulated by the current pulses being shifted in relation to each other without changing their width during continuous operation. From the geometry of the shape of the pulses C a condition for keeping the width of the pulses constant can be derived, viz. that the positive slope of the pulses should be the same from pulse to pulse. This condition is fulfilled also in case of different part input voltages to the converters by the aid of trailing edge adjustment. The positive slope of the current I1a or I2, respectively, is a function of the input voltage and if the part voltages are different the positive slope of the respective current pulses will be different, resulting in the widths of the pulses becoming somewhat different. The error appearing is normally very small since the balancing circuit normally maintains balance. Practical experiments have, however, shown that leading edge adjustment cannot alone maintain balance at high output currents, i.e. when the current pulses are high. Trailing edge adjustment solves the problem with changes in pulse width by broadening one of the pulses somewhat, at the same time as the other pulse is made somewhat thinner so that normal pulse width is restored.

Figure 4:
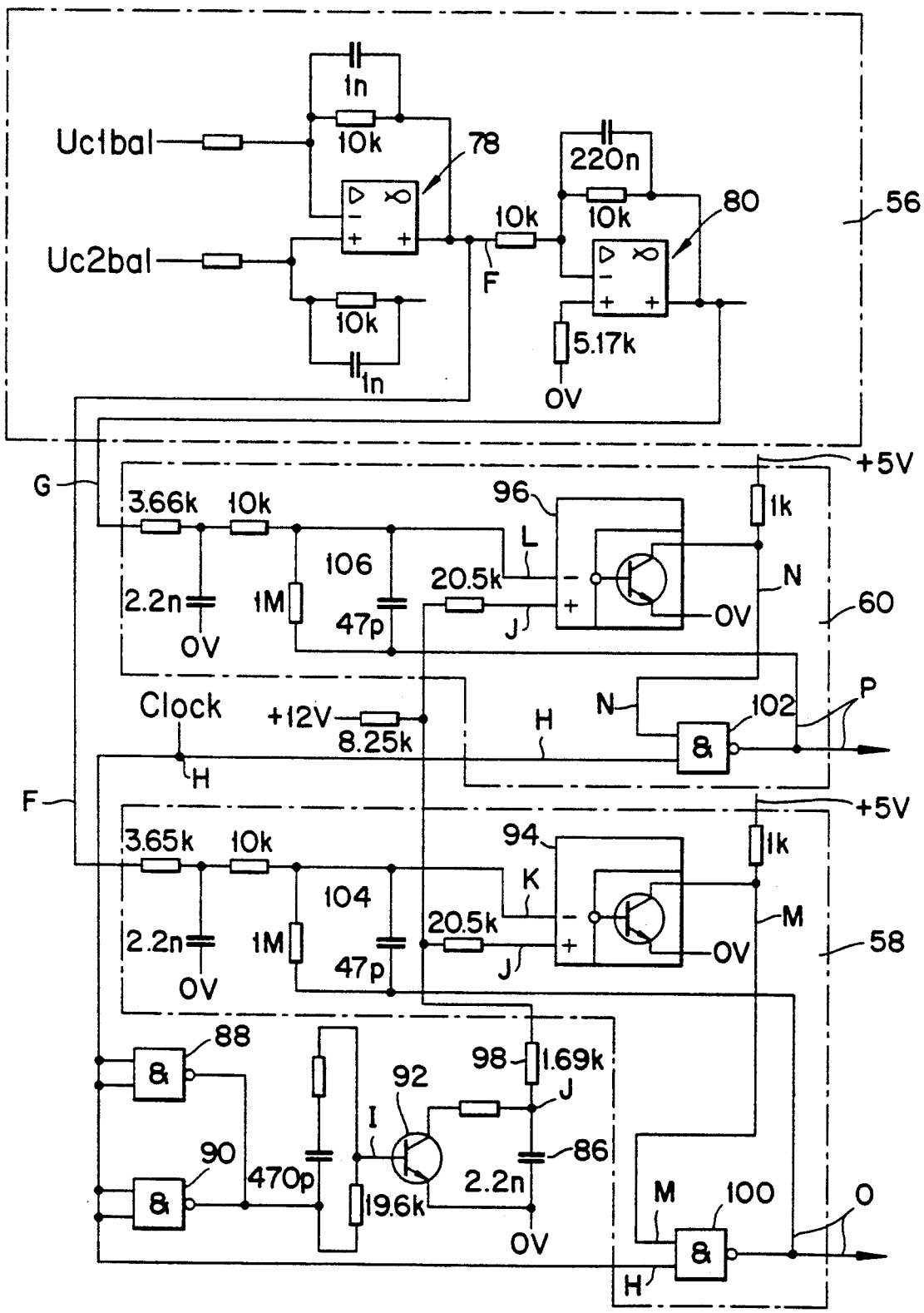
FIG. 4 is a more detailed circuit diagram of an embodiment of a portion of the circuit according to FIG. 2.
Figure 5:
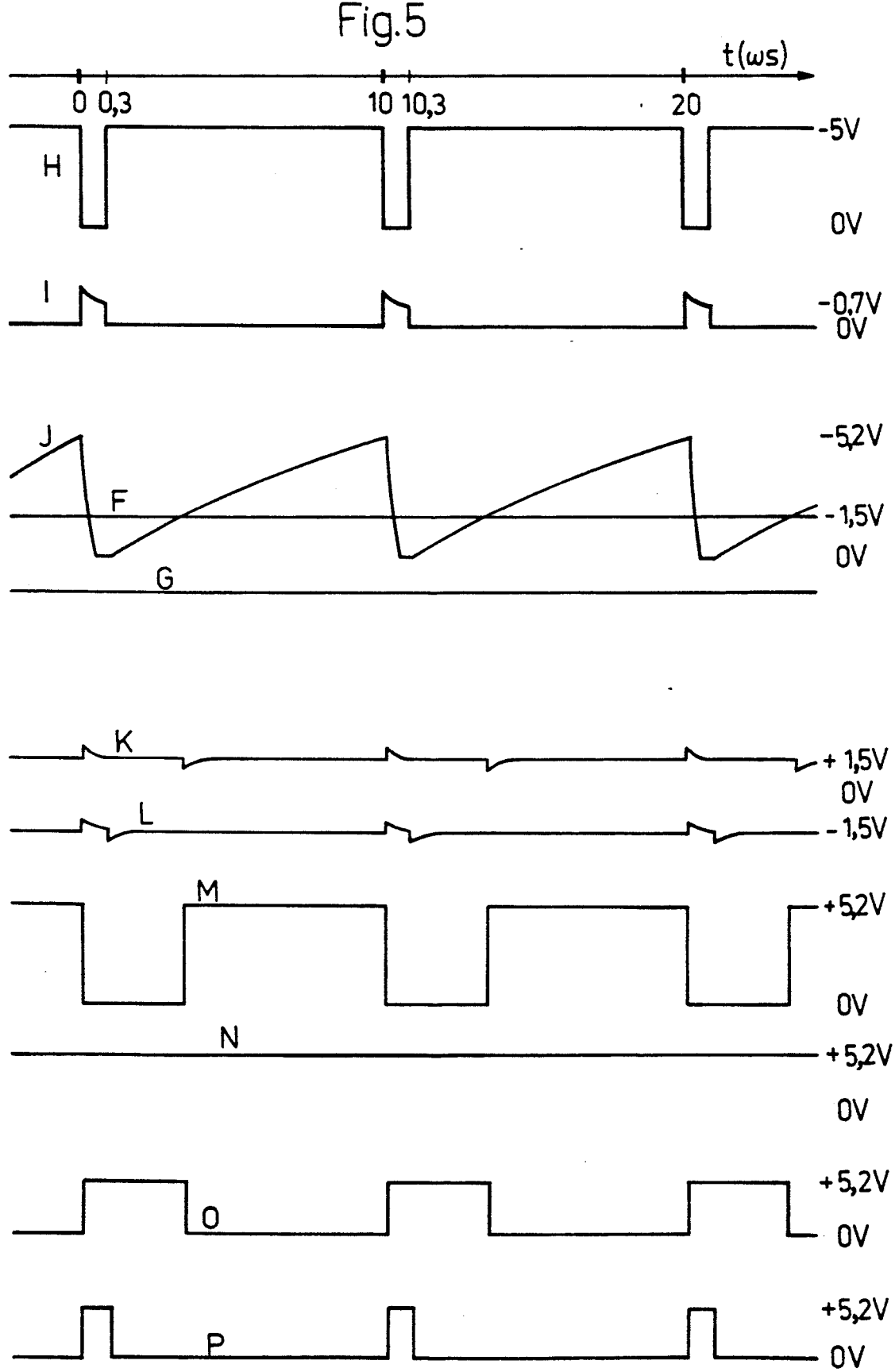
FIG. 5 illustrates voltage curves in connection with FIG. 4.

An embodiment of a more detailed circuit solution of the cooperation between elements 56–62 in FIG. 2 is shown in FIG. 4, and is illustrated more closely by means of the diagrams in FIG. 5. In the last-mentioned Figures only as an example the values of certain components and voltage levels, respectively, are given.

The two voltages $U_1$ and $U_2$ to be balanced are received in the block 56 and are measured each with an insulating amplifier not shown. The measured signals designated Uc1bal and Uc2bal, are fed into a differential amplifier 78. The obtained signal, designated F is fed into an inverter 80 on the one hand and into the first pulse widening circuit 58 on the other hand. The inverted signal, designated G, is fed into the second pulse widening circuit 60.

The clock generator (now shown in FIG. 4) emits the clock signal H which according to the above consists of very short pulses with a pulse width of approximately 300 ns and a cycle of 10 μs. The clock signal sets to zero a ramp generator consisting of a capacitor 86 via two parallel amplifiers 88, 90 and a transistor 92. The base signal to the transistor 92 is designated I and the ramp signal over the capacitor 86 is designated J.

Each of the pulse widening circuits 58, 60 includes a comparator 94 or 96, respectively. The ramp signal over the capacitor 86 is fed to the respective positive inputs of the comparators 94 and 96. The voltage on said positive input will deviate somewhat from the voltage J due to the series resistance designated 98 which, however, may be neglected. Signals resulting from the signals F and G on the respective negative inputs of the comparators 94 and 96 designated K and L, respectively.

The output voltages form the comparators 94 and 96, designated M and N, respectively, each fed to one of the inputs of a NAND-gate 100 and 102, respectively. To the second input of the NAND-gates a clock signal H is fed, and the outputs of said gates form the outputs of the respective pulse widening circuits 58 and 60. The corresponding output signals are designated O and P, respectively, corresponding to the signals E2 and E1.

A feed back loop extends from the output of each NAND-circuit to the negative input of the respective comparators via circuits 104 and 106, respectively, each consisting of a resistance and a capacitor in parallel. The small cuts of the curves K and L, being amplified in FIG. 5 for the sake of clearness, originate from this positive feedback and result in secure and distinct switching over of the comparators.

When the clock pulse time 300 ns has passed, the comparators 94 and 96 can provide a negative edge on the respective output when the right time has been attained. The times are determined by the time passing before the ramp signal J reaches the same level as the respective input voltages K and L, affected by the said positive feedback and appearing on the negative inputs of the comparators. In the example shown the clock signal H directly affects the NAND-gate 100 which switches over essentially immediately, this in turn affecting the input voltage K via the feedback so that the comparator 94 switches over and gives rise to the output voltage M. The comparator 96 never does switch over, due to the fact that the voltage L all the time lies below the ramp signal J, this consequently resulting in the output voltage N shown.

The positive edges of the output voltage O from the NAND-gate 100 are determined only by the negative edge of the clock pulse H and the delay of the NAND-gate. The time of its negative edge is determined by the time of the positive edge of the clock pulse H added by the time determined by the ramp signal J, and the delay of the comparator and the NAND-gate.

The curve shape of the output voltage P from the NAND-gate 102 is a direct inversion of the clock pulse H with associated gate delay.

Figure 6:
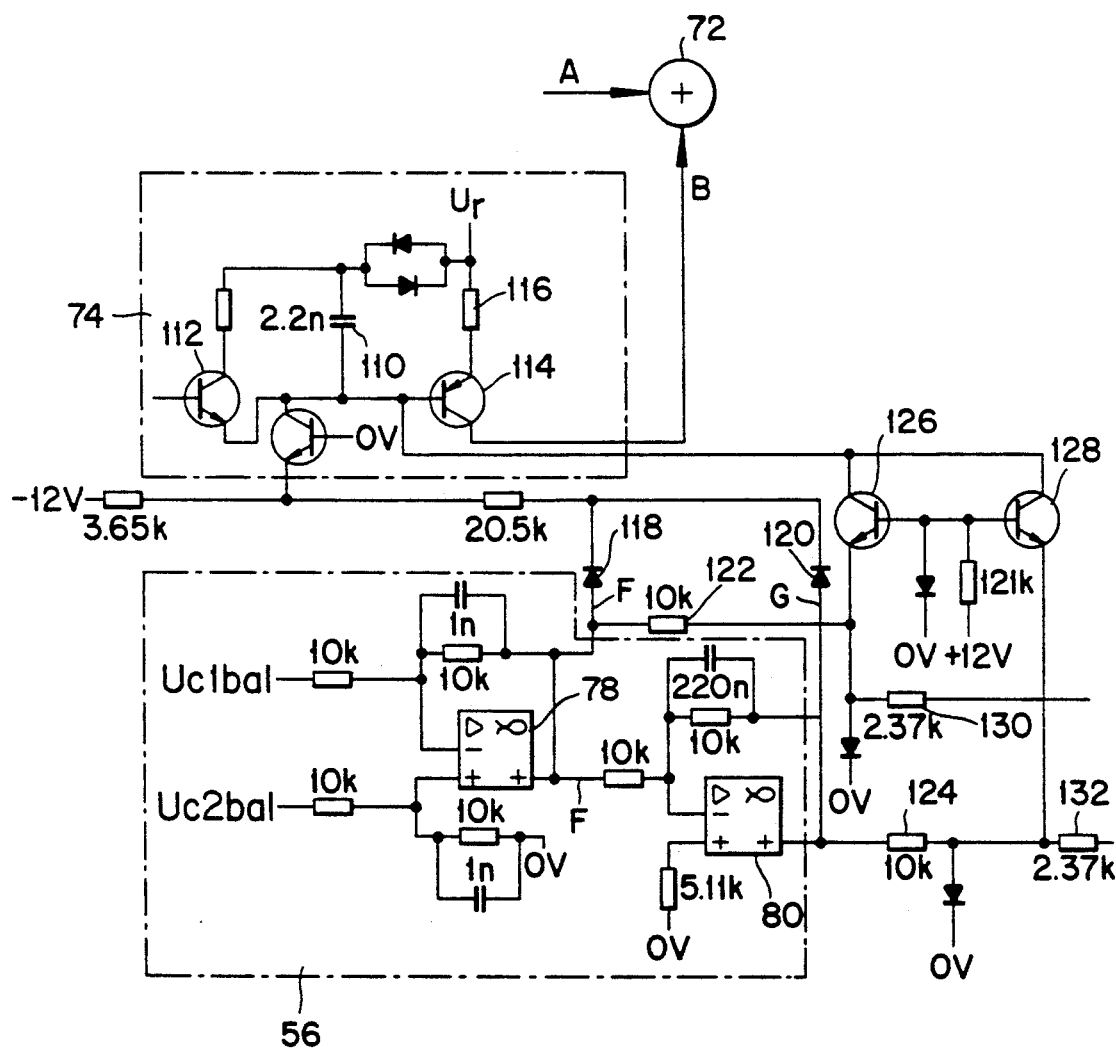
FIG. 6 is a more detailed circuit diagram of an embodiment of another portion of the control circuit according to FIG. 2.

An embodiment of a more detailed circuit solution of the generation of the ramp signal B is shown in FIG. 6.

The ramp generator 74 comprises as a main component a capacitor 110 and a zero setting transistor 112. The ramp signal over the capacitor 110 is a voltage signal which by means of a transistor 114 and resistor 116 is converted to a current signal.

The slope of the compensating ramp is decreased in proportion to the magnitude of the deviation from balance, i.e. between the voltages U1 and U2. This is obtained by means of the voltages F and G obtained as described above from the balance sensing circuit 56 via diodes 118 and 120, respectively, connected for receiving these voltages. Resistors 122 and 124, respectively, and transistors 126 and 128, respectively, give a contribution to the slope of the ramp which is twice as great as the decrease via the diodes 118 and 120, respectively. The bistable circuits 676 connected to the ramp generator as described above chooses via resistors 130 and 132, respectively, the ramp pulses which are to receive contribution, and the ones which are not.

To sum up, the slope of all ramp pulses is first decreased, whereupon twice as mush as that removed is added to every second pulse, cf. the dashed ramps of the curve shape B in FIG. 3.

Figure 7:
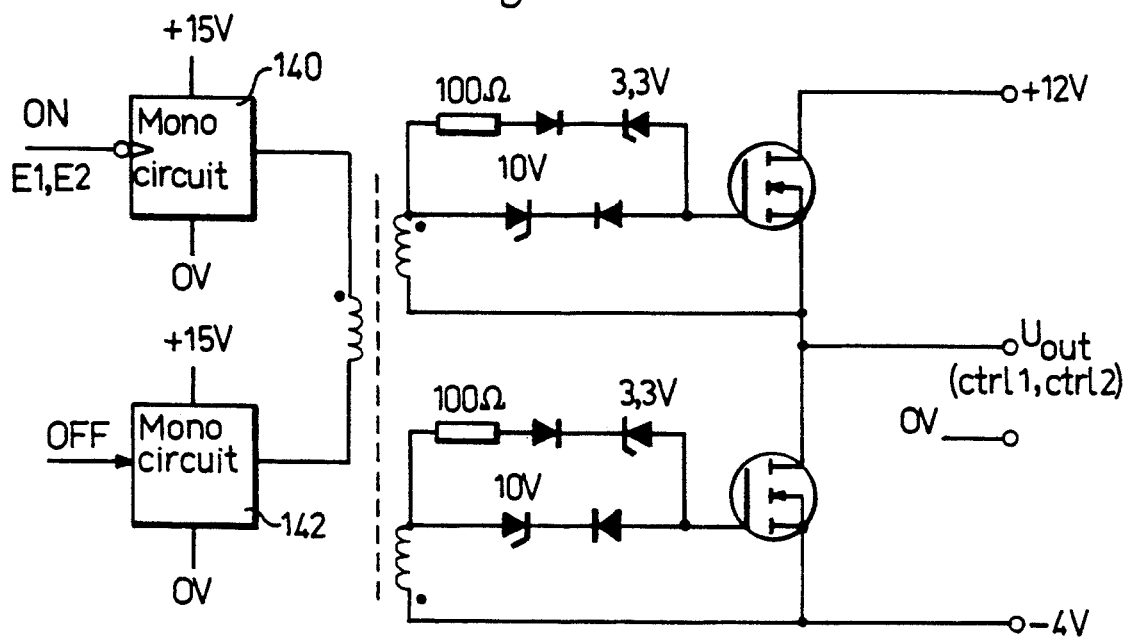
FIG. 7 is a more detailed circuit diagram of an embodiment of a further portion of the control circuit according to FIG. 2

FIG. 7 only very schematically indicates a possible embodiment of the pulse shaping and operating circuits 64 and 66 indicated earlier in the form of blocks in FIG. 2. The dimensioning values included in the diagram shall, of course, only be regarded as examples. The circuit 64, 66 comprises on its two inputs two monostable circuits 140, 142. The trigging signals E1 and E2, respectively, are fed to the flip-flop 140 which switches over on the negative edge of the signals. On the output of the circuit the two signals ctrl1 and ctrl2 are obtained in the way indicated in the Figure. The closer accomplishment and function of the circuit 64, 66 should be clear to the man of the art without any further explanations here.

Figure 8:
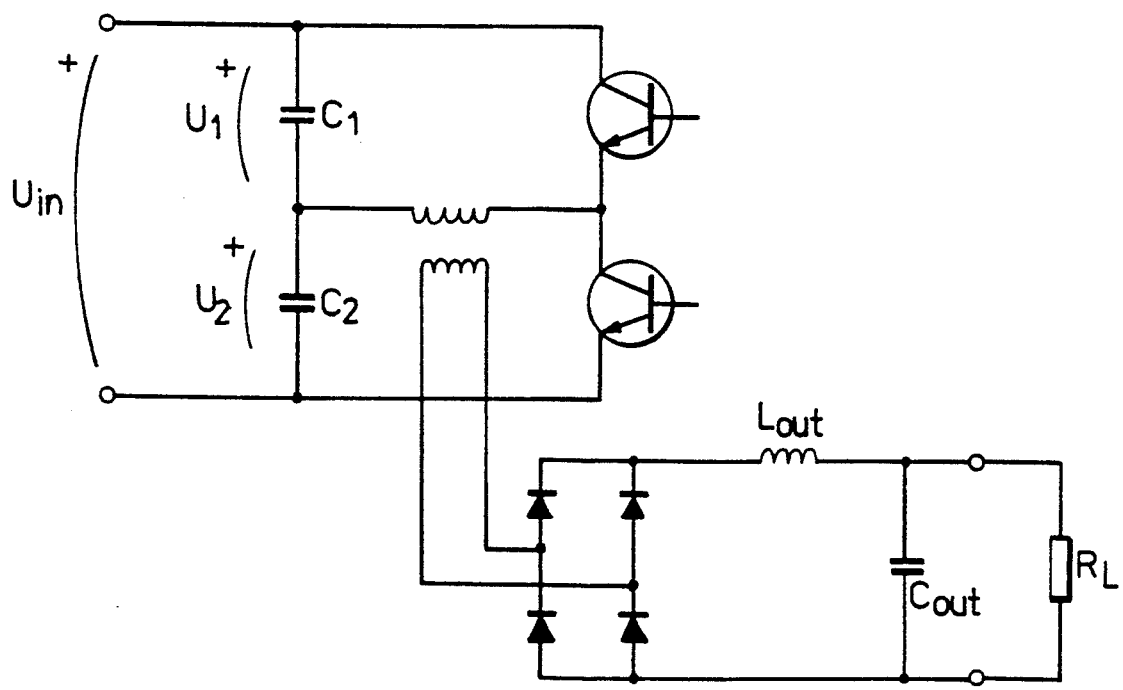
FIG. 8 is a principle circuit diagram of another converter circuit in which the invention can be used.

Of course, the invention is not limited to the embodiments described above and shown in the drawings but can be modified within the scope of the following claims. Thus, it should particularly be noted that the invention is not only usable in a circuit arrangement of the kind shown in FIG. 1, which is a current mode so called "double forward" circuit with series connected inputs, but also as well in e.g. a current mode half bridge of a kind indicated in FIG. 8. The problem of such a current mode half bridge is described on page C3-4 in a publication from the company Unitrode 1986 with the title "Switching Regulated Supply Design Seminar Manual".

Furthermore the invention can be used in certain types of converters intended for this continuous operation, wherein possibly only the leading edge adjustment need be used. The leading edge adjustment functions alone excellently at low and medium output currents, more poorly at high ones. It works in two different modes: Besides the position of the current pulses only their amplitude is affected at medium output currents, whereas at discontinuous currents amplitude and width are affected besides the position.

The trailing edge adjustment functions alone excellently at high and medium loads, and not at all at low ones. At low output current, when the output choke approaches discontinuous operation, there is a risk of locking due to the regulation characteristic changing sign. The trailing edge adjustment only changes the width of the current pulses whereas the leading edge adjustment, during continuous operation of the output choke, essentially varies the position and amplitude of the current pulses.

We claim:

1. A method for controlling power valves included in at least one converter forming part of a converter circuit which on its input receives at least two DC input voltages and transmits current pulses respectively corresponding to these DC voltages to a common load via a common output filer, said controlling aiming at keeping the DC voltages equal, comprising the steps of:

determining a stop time for the current pulses as a function of a difference between the input voltages such that the stop time of current pulses originating from a lower of the at least two input voltages is postponed in relation to the difference;

determining a starting time of the current pulses as a function of the difference between the input voltages such that the starting time for a current pulse originating from a lower of the at least two input voltages is postponed in relation to the difference; and regulating the input voltages by shifting the respective current pulses with respect to each other essentially without changing widths of the current pulses.

2. A method according to claim 1, comprising the further step of triggering on the current pulses by the trailing edge of a triggering pulse with a fixed repetition period and a width which is varied in proportion to the difference between the input voltages.

3. A method according to claim 1, comprising the further steps of:

generating a stop pulse for each current pulse by means of a ramp voltage, the ramps of which appear with a repetition period which is equal to the repetition period of the current pulse originating from an input voltage divided by the number of input voltages, the slope of the ramps determining the position of the stop pulse; and changing the slope of the ramps corresponding to the current pulses in relation to deviation from a mean value of the input voltages.

4. A method according to claim 3, comprising the further step of regulating the mean value of the slope changes to zero.

5. A balancing circuit comprising:
means for receiving a plurality of input voltages;
means for transmitting a plurality of current pulses corresponding to said input voltages;
means for shifting said current pulses in time while maintaining a time duration of said current pulses;
means for determining a difference between the input voltages and for determining a stop time of the current pulses as a function of a difference between the input voltages such that a stop time of current pulses originating from a lower input voltage is postponed in relation to the difference; and
means for determining a starting time of the current pulses as a function of a difference between the input voltages such that the starting time for a current pulse originating from a lower input voltage is postponed in relation to the difference.

6. The balancing circuit of claim 5, further comprising:
a ramp voltage generator for generating a ramp voltage having ramps appearing with a repetition period equal to a repetition period of a current pulse originating from an input voltage divided by a total number of input voltages; and
means for generating, by means of the ramp voltage, a stop pulse, the position of which is determined by a slope of the ramps, said ramp voltage generator being controlled by output signals from said circuit means for determining the difference between the input voltages so that the slope of ramps corresponding to the current pulses is changed in relation to deviation from a mean value of the input voltages.

7. The balancing circuit of claim 6, further comprising:
means for decreasing the slope of all ramps in relation to a magnitude of the difference between the input voltages; and
means for increasing the slope of some ramps so that a mean value of all slope changes is zero.

8. The balancing circuit of claim 5, further comprising:
means for producing a triggering pulse with a fixed repetition period and a width which is varied in proportion to the difference between the input voltages; and
means for triggering the current pulses on the trailing edge of this triggering pulse.

9. A circuit arrangement for controlling power valves included in at least one converter forming part of a converter circuit which has input means for receiving at least two DC input voltages and means for transmitting current pulses respectively corresponding to said DC voltages to a common load via a common output filter said controlling aiming at keeping the DC voltages alike, comprising:
means for determining a difference between the input voltages and for determining a stop time of the current pulses as a function of a difference between the input voltages such that the stop time of current pulses originating from a lower input voltage than another one is postponed in relation to the difference;
means for determining a starting time of the current pulses as a function of the difference between the input voltages such that the starting time for a current pulse originating from a lower input voltage than another one is postponed in relation to the difference; and
a control circuit for regulating the input voltages by shifting the respective current pulses based on said determining means with respect to each other essentially without changing widths of the current pulses.

10. An arrangement according to claim 9, further comprising:
a ramp voltage generator for generating a ramp voltage having ramps appearing with a repetition period equal to the repetition period of the current pulse originating from an input voltage divided by the number of input voltages; and
circuit means for generating, by means of the ramp voltage, a stop pulse, the position of which being determined by the slope of the ramps, said ramp voltage generator being controlled by output signals from said circuit means for determining the difference between the input voltages so that the slope of ramps corresponding to the current pulses is changed in relation to deviation from a mean value of the input voltages.

11. An arrangement according to claim 10, further comprising:
first circuit means for decreasing the slope of all ramps in relation to the magnitude of the difference between the input voltages; and
second circuit means for increasing the slope of some ramps so that the mean value of all slope changes is zero.

12. An arrangement according to claim 9 further comprising:
third circuit means for producing a triggering pulse with a fixed repetition period and a width which is varied in proportion to the difference between the input voltages; and
fourth circuit means for triggering on the current pulses on the trailing edge of this triggering pulse.

* * * * *